(12) United States Patent
Müller

(10) Patent No.: US 12,742,478 B2
(45) Date of Patent: Sep. 22, 2026

(54) CONSTANT VELOCITY PLUNGING JOINT AND METHOD OF PRODUCING A CONSTANT VELOCITY PLUNGING JOINT

(71) Applicant: GKN Driveline Deutschland GmbH, Offenbach (DE)

(72) Inventor: Peter Müller, Offenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 10 days.

(21) Appl. No.: 19/171,569

(22) Filed: Apr. 7, 2025

(65) Prior Publication Data

US 2025/0327489 A1 Oct. 23, 2025

(30) Foreign Application Priority Data

Apr. 19, 2024 (DE) ........................ 102024111041.4

(51) Int. Cl.
*F16D 3/227* (2006.01)
*F16D 3/223* (2011.01)

(52) U.S. Cl.
CPC .... *F16D 3/227* (2013.01); *F16D 2003/22303* (2013.01); *F16D 2003/22309* (2013.01);
(Continued)

(58) Field of Classification Search
CPC ........ F16D 3/223; F16D 3/2237; F16D 3/224; F16D 3/227; F16D 3/229;
(Continued)

(56) References Cited

U.S. PATENT DOCUMENTS 5,616,081 A * 4/1997 Krude .................. F16D 3/2237 464/145
6,071,195 A * 6/2000 Krude .................... F16D 3/227 464/145
(Continued)

FOREIGN PATENT DOCUMENTS

DE 102005063006 A1 4/2007
JP H1113780 A 1/1999
(Continued)

OTHER PUBLICATIONS

German Office Action for German Application No. DE102024111041.4 dated Jan. 8, 2025 (4 pages).

*Primary Examiner* — Daniel J Wiley
(74) *Attorney, Agent, or Firm* — Reising Ethington P.C.

(57) ABSTRACT

A constant velocity plunging joint having an outer joint part, an inner joint part, balls which are arranged in pairs of tracks each comprising an outer ball track and an inner ball track, and a ball cage with circumferentially distributed cage windows, in each of which one of the balls is accommodated. An outer ring line through all ball centers on the outer ball tracks has an irregular shape with a largest and smallest outer ring line diameter. The inner ball tracks are produced in such a way that an inner ring line through all ball centers has an irregular shape with a largest and smallest inner ring line diameter, and wherein the inner joint part is mounted relative to the outer joint part such that an angle formed between the largest inner ring line diameter and the largest outer ring diameter is smaller than 30°.

20 Claims, 5 Drawing Sheets

(52) U.S. Cl.
CPC .................. *F16D 2250/003* (2013.01); *F16D 2250/0053* (2013.01); *F16D 2250/0084* (2013.01); *F16D 2300/10* (2013.01)

(58) Field of Classification Search
CPC . F16D 2003/22303; F16D 2003/22306; F16D 2003/22309; F16D 2003/2265; Y10S 464/906
See application file for complete search history.

(56) References Cited

U.S. PATENT DOCUMENTS 6,497,622 B1 * 12/2002 Bilz ........................ F16D 3/223 384/523
8,499,457 B2 * 8/2013 Kobayashi .......... B60B 27/0094 29/898.07
11,446,748 B2 9/2022 Giráldez et al.
11,815,138 B2 * 11/2023 Maucher ................. F16D 3/223
2001/0006910 A1 * 7/2001 Krude ................... F16D 3/2237 464/145
2004/0005931 A1 * 1/2004 Wang ...................... F16D 3/223 464/145
2004/0137991 A1 * 7/2004 Weckerling ........... F16D 3/2237 464/144
2014/0206463 A1 * 7/2014 Gremmelmaier ......... F16D 3/24 464/141
2020/0132128 A1 * 4/2020 Krings .................... F16D 3/223
2021/0140488 A1 * 5/2021 Benner ................... F16D 3/223
2024/0035520 A1 * 2/2024 Maucher ................. F16D 3/223
2024/0360876 A1 * 10/2024 Maucher ................. F16D 3/223

FOREIGN PATENT DOCUMENTS

JP 2005337290 A 12/2005
WO WO2018072835 A1 4/2018
WO WO2023006229 A1 2/2023

* cited by examiner 10
18
20
11
1B
RL11
RL12
1C
DImax
α
DOmax
1C
13
14
12
15
17
16
1B
D14
M14
22
14
22'
ER
γ22
γ22'

42
18
EM,Ek
12
11
41
39
43
A10
δ

38
14
20
13
12
11
13
16
41
39
43
A10
δ

38
42
26

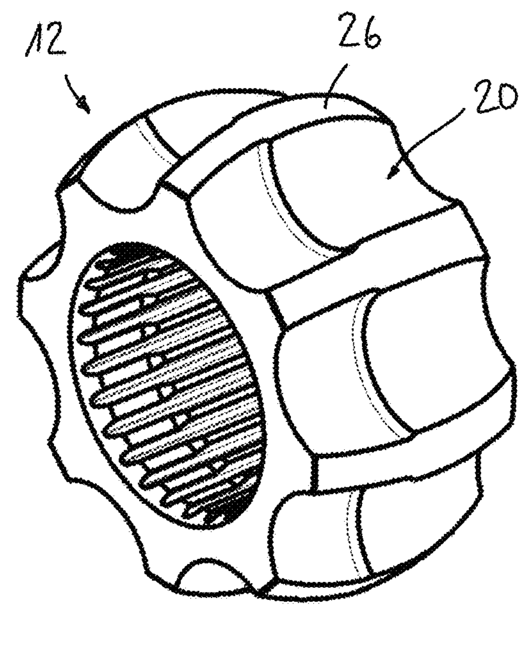
Fig. 3A
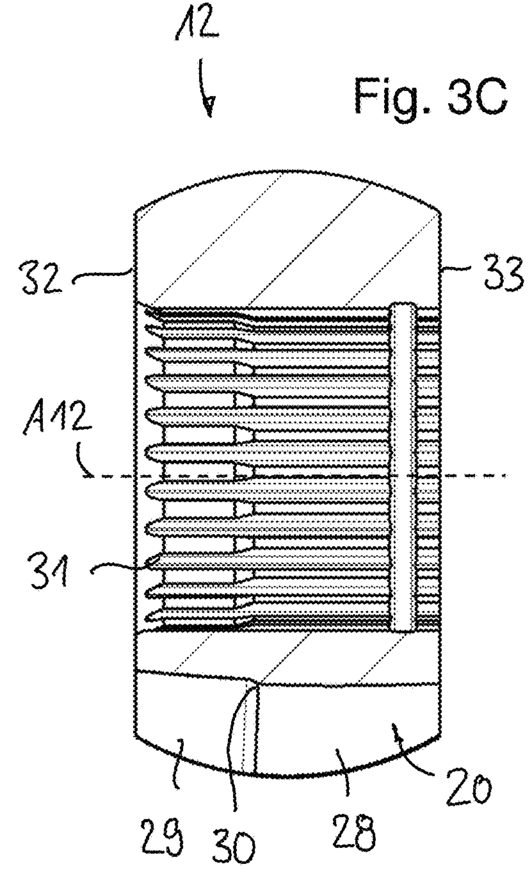
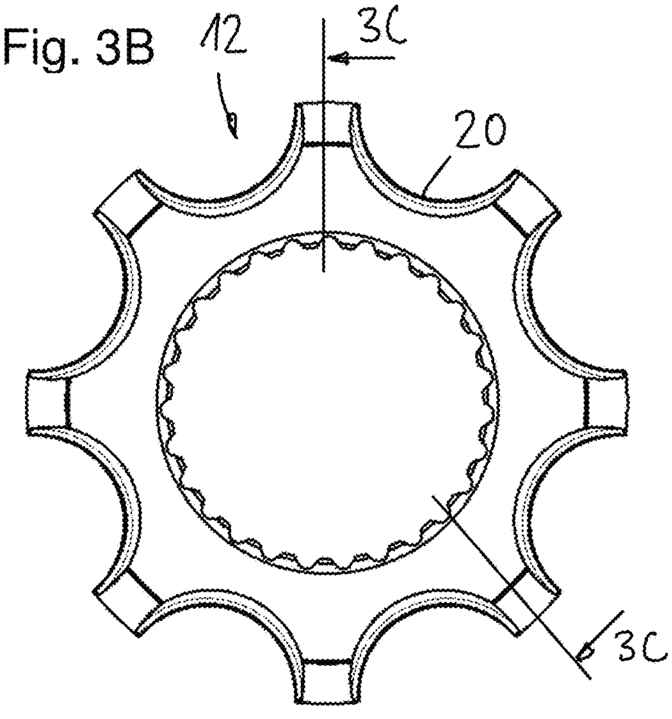
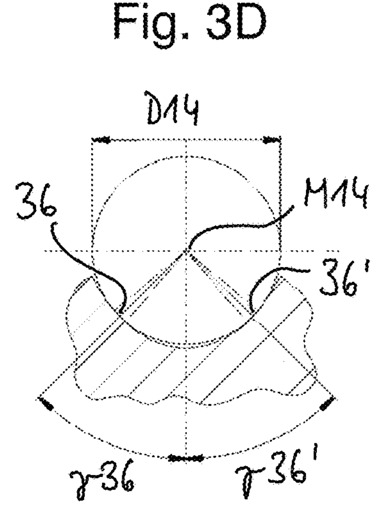

11
23
24
38
21
19
16
18

11
37o
37m
37b
18
23
24
19
A11
21
T25
m18

CONSTANT VELOCITY PLUNGING JOINT AND METHOD OF PRODUCING A CONSTANT VELOCITY PLUNGING JOINT

CROSS REFERENCE TO RELATED APPLICATIONS

This application claims priority to German Patent Application No. DE102024111041.4 filed on Apr. 19, 2024, and the entire content of this priority application is incorporated herein by reference in its entirety.

TECHNICAL FIELD

The disclosure relates to a constant velocity plunging joint and a method for producing a constant velocity plunging joint. Constant velocity plunging joints are designed to transmit torque while allowing for angular and sliding movement between an outer joint part and an inner joint part.

BACKGROUND

From DE 10 2005 063 006 A1, an inner joint part for a constant velocity plunging joint is known. The inner joint part has an outer spherical guide face for guiding a ball cage and several circumferentially distributed ball tracks formed in the spherical guide face for receiving torque-transmitting balls. The ball tracks each have a hard-machined first track section for guiding the balls and a mechanically unmachined second track section that has no guiding function for the balls.

A method for machining ball tracks and guiding webs of an inner joint part for a constant velocity joint in a single clamping operation is known from WO 2018/072835 A1. This involves mechanically machining at least a first ball track in a first rotational position and then rotating the inner joint part into a second rotational position for machining at least one further ball track. The method provides for at least one guiding web to be machined while the inner joint part is being rotated from the first rotational position into the second rotational position.

From JP H11 13780 A, a ball joint with an outer and inner joint part is known. The inner joint part is forged from a blank and heat-treated, leaving the shape of the ball tracks in the forged state. The dimensions of the ball tracks are measured in order to divide the inner joint part into three groups according to the dimensions. The outer joint part is forged, heat-treated and finished. The ball tracks of the outer joint part are finish-machined by grinding after heat treatment.

A drive shaft with a double offset joint on one side and an undercut-free ball joint on the other is known from JP 2005 337 290 A. The track clearance of the ball joint is in the range of 20 to 200 micrometers. The pitch circle diameter (PCD) of the ball tracks of the outer race and the inner race is measured and classified according to a bandwidth of approximately 20 μm. The combination of several outer races and the inner races results in a raceway clearance of around 20 to 60 μm for the ball joint and 20 μm for the double offset joint. A mapping process is performed to determine the outer race and inner race, which are paired so that the clearance is about 80 μm. The ball tracks of the inner and outer race are finish-machined by cold forging.

An object of at least some implementations of the present disclosure is to propose a constant velocity plunging joint, which can be produced efficiently and has good properties in terms of vibration behavior (noise, vibration, roughness, also referred to as "NVH") and a long service life. The object is also to propose an efficient method for producing such a constant velocity plunging joint.

SUMMARY

A constant velocity plunging joint is proposed, comprising an outer joint part with an outer part longitudinal axis and circumferentially distributed outer ball tracks, wherein at least partial sections of the outer ball tracks are hardened, wherein the outer ball tracks are mechanically finish-machined before hardening, that is, mechanically unmachined after hardening; an inner joint part with an outer spherical guide face and several circumferentially distributed inner ball tracks, wherein at least partial sections of the inner ball tracks are hardened and machined; balls arranged in pairs of tracks each comprising an outer ball track and an inner ball track; a ball cage arranged between the outer joint part and the inner joint part and comprising an inner cage face, an outer cage face and circumferentially distributed cage windows which each receive at least one of the balls; wherein, in a cross-section through the joint in aligned condition and with the balls in contact with the outer ball tracks, an outer ring line through all ball centers of the balls has an irregular shape with a largest outer ring line diameter (DOmax) and a smallest outer ring line diameter (DOmin), wherein the largest outer ring line diameter (DOmax) is greater than the smallest outer ring line diameter (DOmin) by an outer diameter difference value (DOdiff) of at least 0.15%, and wherein a mean outer ring line diameter (DOmid) is defined as half the sum of the largest outer ring line diameter (DOmax) and the smallest outer ring line diameter (DOmin), that is DOmid=(DOmax+DOmin)/2; wherein the inner ball tracks of the inner joint part are produced such that, in the cross-section through the joint in the aligned condition and with balls in contact with the inner ball tracks, an inner ring line through all ball centers of the balls has a non-circular shape with a largest inner ring line diameter (DImax) and a smallest inner ring line diameter (Dimin), wherein the largest inner ring line diameter (DImax) is greater than the sum of the mean outer ring line diameter (DOmid) and 0.25 times the outer diameter difference value (DOdiff), and wherein the smallest inner ring line diameter (Dimin) is smaller than the difference between the mean outer ring line diameter (DOmid) and 0.25 times the outer diameter difference value (DOdiff); wherein the inner joint part is mounted relative to the outer joint part such that an angle formed between the largest inner ring line diameter (DImax) and the largest outer ring diameter (DOmax) is less than 30°.

An advantage of the constant velocity plunging joint, which is also abbreviated as plunging joint or joint, is that it has a long service life and good properties with regard to noise, vibration and harshness behavior ("NVH") with simple production. When hardening joint parts, especially the outer joint parts of plunging joints, which are relatively long and thin-walled in relation to the component diameter, undesirable hardening distortions can occur. These hardening distortions, which can only be reduced to a certain extent using process technology, can in turn lead to different play of the balls in the respective track pair over the circumference and to impairments in terms of service life or NVH properties. For outer joint parts with a very irregular ring line, geometrically approximated inner joint parts are produced and assembled to form a joint, wherein the largest diameter (DOmax) of the ring line of the outer joint part can be more than 0.15%, 0.2% or 0.25% larger, and for example less than 2.0%, 1.5% or 1.0% smaller than its smallest diameter (DOmin). The inner joint part respectively its ball tracks are deliberately made non-circular, and positioned so as to match the production-related non-circular shape of the outer part, and mounted together therewith. For this purpose, the angle formed between the largest ring line diameter of the inner joint part and the largest ring line diameter of the outer joint part is less than 30°. Overall, this results in a reduction in the maximum ball play in the associated ball tracks, which has a positive effect on the vibration behavior and service life of the joint.

The outer ring line and/or the inner ring line are formed in such a way that they may run continuously and/or steplessly around the circumference. The cross-section through the aligned joint used to define the outer and/or inner ring line can lie in a main working area of the joint, in particular within a range of plus minus 10 mm around an axial center of the outer ball tracks. To facilitate assembly, the inner joint part and/or the outer joint part can be provided with a marking representing an associated largest or smallest ring line diameter. In the context of the present disclosure, aligned joint or aligned condition of the joint means that the longitudinal axes of the outer and inner joint part are coaxially aligned, i.e. the articulation angle is 0°.

According to an embodiment, the largest inner ring line diameter (DImax) can be equal to the sum of the mean outer ring line diameter (DOmid) and 0.4 times to 0.6 times the outer diameter difference (DOdiff). Alternatively or additionally, the smallest inner ring line diameter (Dimin) can be equal to the difference between the mean outer ring line diameter (DOmid) and 0.4 to 0.6 times the outer diameter difference value (DOdiff).

The number of ball tracks and/or balls in the joint can be selected according to the technical requirements. As a rule, joints with 6 or 8 balls are used in motor vehicle drivetrains, although joints with other numbers of balls and/or tracks are also used. A pitch angle is formed between two balls that are adjacent in the circumferential direction. According to a specific embodiment, the angle formed between the largest inner ring diameter (DImax) and the largest outer ring diameter (DOmax) can be smaller than the pitch angle.

In a longitudinal section through the track base, the outer joint part has a radial wall thickness, wherein the ratio of the radial wall thickness to the mean outer ring line diameter (DOmid) may be less than or equal to 0.075. The inner face of the outer joint part, in which the outer ball tracks are formed radially outwards, can be machined. This makes it easy to achieve the desired manufacturing tolerances with high accuracy. The outer ball tracks can be finished mechanically before hardening, in particular by forging, or by machining, in particular by milling.

The outer spherical guide face of the inner joint part is ideally round when viewed in cross-section through the inner joint part, i.e. produced with a manufacturing tolerance of in particular plus/minus 0.03 mm with respect to a nominal outer diameter. The outer spherical guide face may be hardened at least in partial sections and machined after hardening. The ball tracks of the inner joint part can be machined, at least in functional sections, before and/or after hardening. Machining the ball tracks before hardening results in particularly efficient production. Machining after hardening results in high process reliability and/or manufacturing accuracy. The ball tracks may be produced with a manufacturing tolerance of less than plus/minus 0.1 mm, in particular less than plus/minus 0.03 mm. Machining to achieve the desired high manufacturing accuracy can be carried out by grinding, for example.

According to an embodiment, at least part of the peripheral faces of the ball cage are ideally round, that is to say, in particular produced with a manufacturing tolerance of plus/minus 0.03 mm with respect to a circular nominal peripheral diameter. The ball cage can have a curved outer spherical control face around a first center point (MK1) and an outer free face as well as an inner spherical control face around a second center point (MK2), wherein the first center point (MK1) and the second center point (MK2) are each located at an axial distance from a window respectively ball center plane (EK) of the ball cage. Between the inner spherical control face and the outer free face, the ball cage has a minimum radial wall thickness, wherein the ratio of the minimum radial wall thickness to the pitch circle diameter (PCD) can be less than 0.08, for example.

According to an embodiment, the balls can be produced with a manufacturing tolerance of less than plus minus four micrometers in relation to a nominal ball diameter. This provides a high degree of accuracy so that no classification of the balls according to their dimensions to individual ball tracks is required.

The plunging joint can, for example, be designed in such a way that the inner joint part is angularly movable relative to the outer joint part by a maximum articulation angle of up to 20°. Furthermore, the constant velocity plunging joint can be designed as a double offset joint, although other joint types such as VL or XL joints are also possible.

In the installed state, a joint center plane (EM) is defined when the joint is aligned, wherein the outer ball tracks around the joint center plane each have a central working section and, adjacent to the central working section towards the base and the joint opening, secondary sections on the base side and opening side, respectively. The outer ball tracks can be slightly widened in the base-side secondary track section and/or in the opening-side secondary track section compared to the central working section, for example by at least 0.1 mm.

The above object is further solved by a method for manufacturing a constant velocity plunging joint, comprising: producing an outer joint part having a longitudinal axis, a connection side and an opening side, an inner face and outer ball tracks, the outer ball tracks being soft-machined and then hardened, that is to say remaining mechanically unmachined after hardening, wherein, viewed in a cross-section through the outer joint part, ball contact points of the outer ball tracks define an outer ring line having an irregular shape with a largest outer ring line diameter (DOmax) and a smallest outer ring line diameter (DOmin), wherein the largest outer ring line diameter (DOmax) is larger than the smallest outer ring line diameter (DOmin) by an outer diameter difference value (DOdiff) of at least 0.15%, 0.2% or 0.25%, and wherein a mean outer ring line diameter (DOmid) is defined as half the sum of the largest outer ring line diameter (DOmax) and the smallest outer ring line diameter (DOmin), [DOmid=(DOmax+DOmin)/2]; producing an inner joint part with a longitudinal axis, an outer face and inner ball tracks; wherein the inner ball tracks are soft pre-machined, hardened and finish-machined, wherein the inner ball tracks of the inner joint part are finish-machined by machining such that, viewed in a cross-section through the inner joint part, ball contact points of the inner ball tracks define an inner ring line having a non-circular shape with a largest inner ring line diameter (DImax) and a smallest inner ring line diameter (Dimin), such that the largest inner ring line diameter (DImax) is greater than the sum of the mean outer ring line diameter (DOmid) and 0.25 times the outer diameter difference (DOdiff), and that the smallest inner ring line diameter (Dimin) is smaller than the difference between the mean outer ring line diameter (DOmid) and 0.25 times the outer diameter difference (DOdiff); producing a ball cage with a cage axis, an inner cage face, an outer cage face and cage windows distributed circumferentially around the cage axis; inserting the inner joint part into the ball cage; inserting the inner joint part with ball cage into the outer joint part in such a way that an angle formed between the largest inner ring line diameter (DImax) and the largest outer ring diameter (DOmax) is less than 30°; and inserting balls into the cage windows, wherein pairs of tracks each consisting of an outer ball track and an inner ball track each accommodate one of the balls.

The method may achieve the same advantages as the above-mentioned product, so that reference is made to the above description. It is understood that all the features mentioned in connection with the joint may be transferred analogously to the method, and vice versa. The method ensures efficient production, as no machining steps are required after hardening in the manufacture of the outer joint part, and any out-of-round shape resulting from hardening distortions is countered by targeted out-of-round production of the inner joint part. Overall, this results in a joint that is easy and cost-efficient to manufacture and has a long service life and good properties in terms of noise, vibration and harshness behavior ("NVH").

BRIEF DESCRIPTION OF THE DRAWINGS

Certain embodiments are explained below with reference to the drawing figures. Herein:

FIG. 3A shows the inner joint part of FIG. 1A in a perspective view;

FIG. 3B shows the inner joint part from FIG. 1A respectively 3A in an axial view;

FIG. 3C shows the inner joint part according to section 3C-3C from FIG. 3B;

FIG. 3D shows a cross-section through a ball track of the inner joint part with a ball received therein as a detail;

DETAILED DESCRIPTION

Figures 1A, 1B, 1C, 1D:
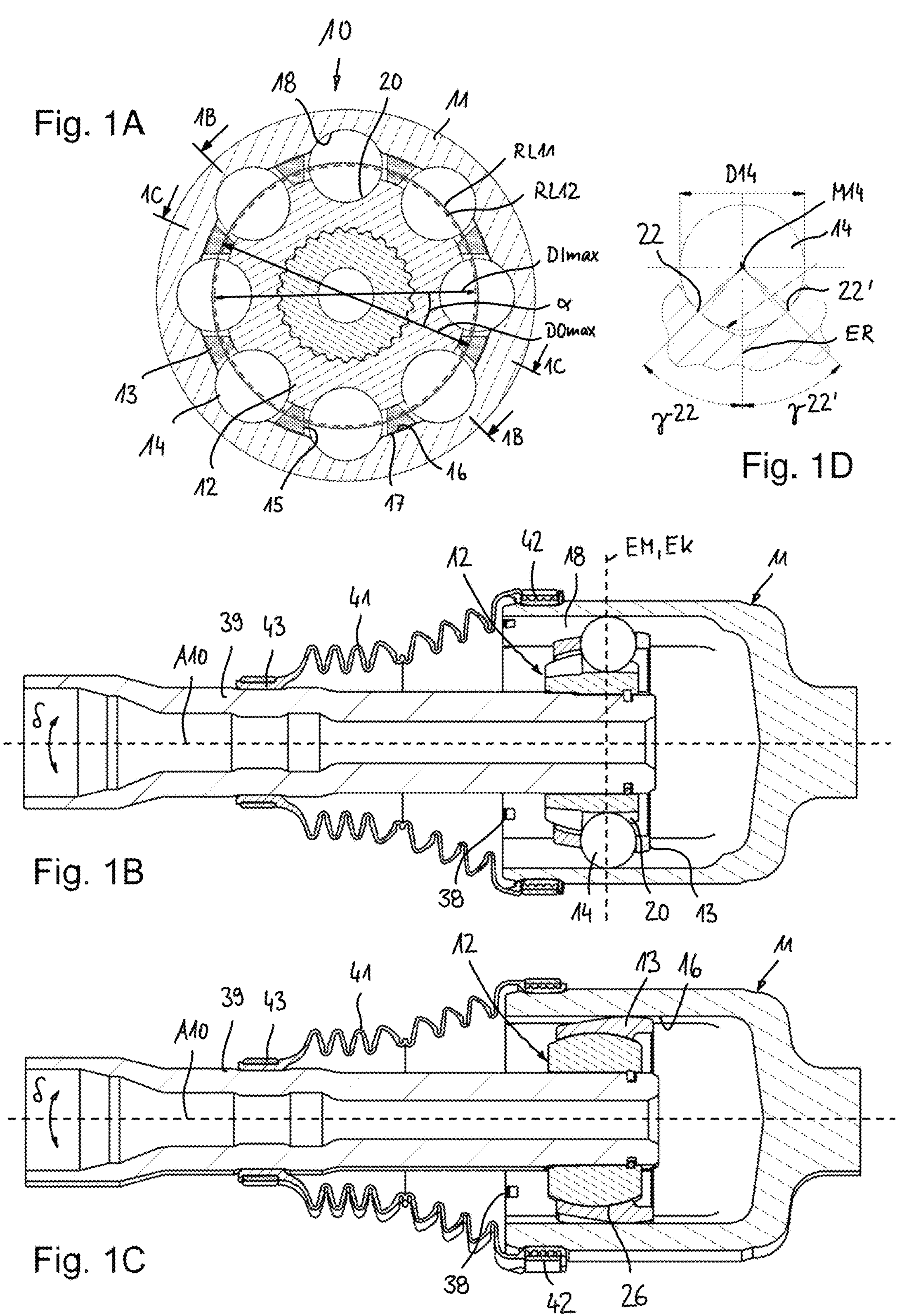
FIG. 1A shows a cross-section of a constant velocity plunging joint.
FIG. 1B shows the constant velocity plunging joint in longitudinal section through a ball plane according to section line 1B-1B from FIG. 1A.
FIG. 1C shows the constant velocity plunging joint in longitudinal section through a web plane according to section line 1C-1C from FIG. 1A.
FIG. 1D shows a cross-sectional view of a ball track of the outer joint part with a ball received therein according to FIG. 1A as a detail.

FIGS. 1A to 1D, together also referred to as FIG. 1, show a constant velocity plunging joint 10 with an outer joint part 11, an inner joint part 12, a ball cage 13 and torque-transmitting balls 14, which are held in windows 15 of the ball cage 13 in a common ball plane EK.

The outer joint part 11 has an inner guide face 16, with which a control face 17 of the ball cage 13, which can be in particular spherical, can come into contact and be guided therein. Furthermore, the outer joint part 11 has an outer part longitudinal axis A11 and several outer ball tracks 18 distributed around the circumference, which extend over a major part of the outer joint part 11 up to the open end respectively opening 19. In each pair of tracks formed by an inner ball track 20 of the inner joint part 12 and an outer ball track 18 of the outer joint part 11, one of the torque-transmitting balls 14 is received respectively guided. The windows 15 of the ball cage 13 and the balls 14 accommodated therein jointly define the ball plane EK. When the joint is articulated, the ball plane EK forms the angle bisecting plane between the outer joint part 11 and the inner joint part 12. At the end 21 opposite the opening 19, the outer joint part 11 is closed like a bell and has a base 23 with an integrally formed journal 24, which serves to transmit torque.

The outer joint part 11 is produced in such a way that the outer ball tracks 18 are finish-worked and then at least partial sections of the outer ball tracks 18 are hardened. This means that the outer ball tracks 18 have been given their final contour before hardening and remain mechanically unmachined after hardening. The inner face 16 of the outer joint part 11, into which the outer ball tracks 18 are formed in a radially outward direction, can be machined, in particular by a cutting process such as turning or grinding. This makes it easy to achieve the desired manufacturing tolerances. The outer ball tracks 18 can be finished mechanically before hardening, in particular by forging, or by machining, in particular by milling.

Figure 2A:
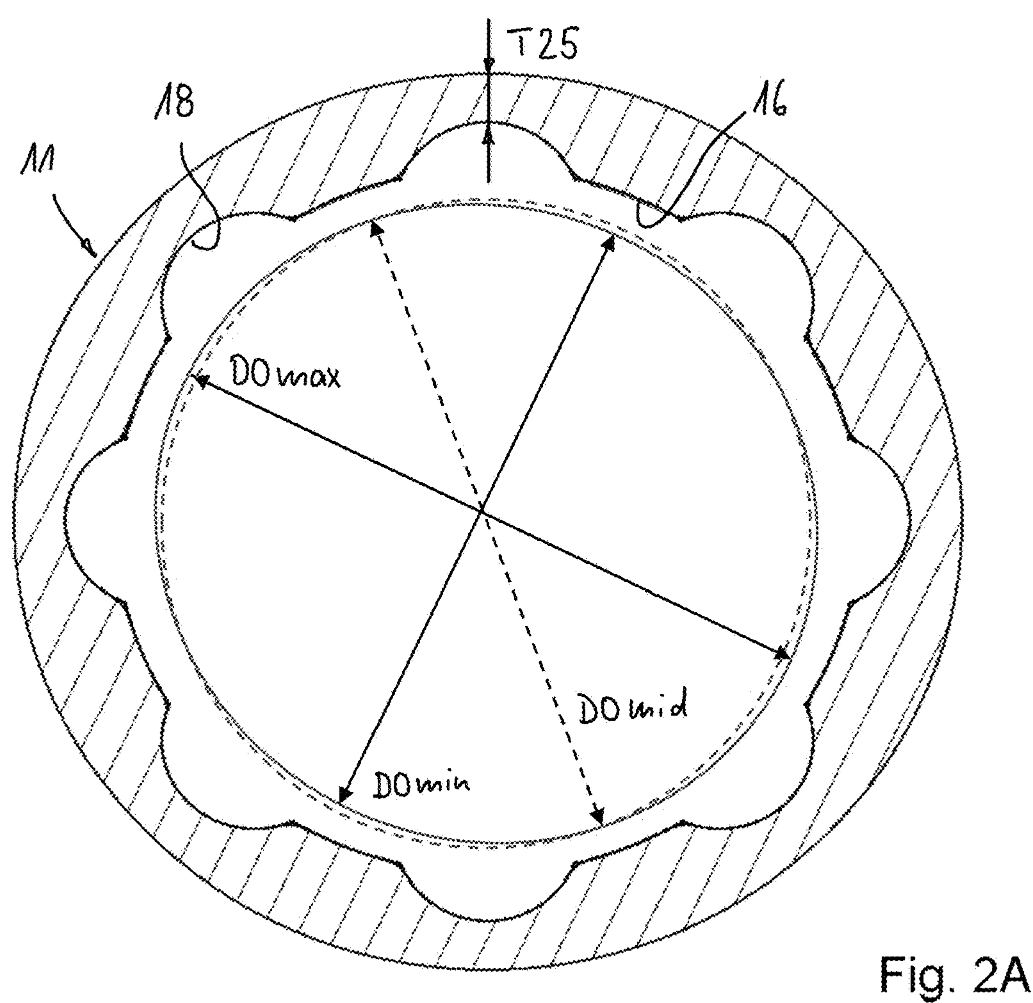
FIG. 2A shows the outer joint part shown in FIG. 1A with the specified dimensions shown in exaggerated form.
Figure 2B:
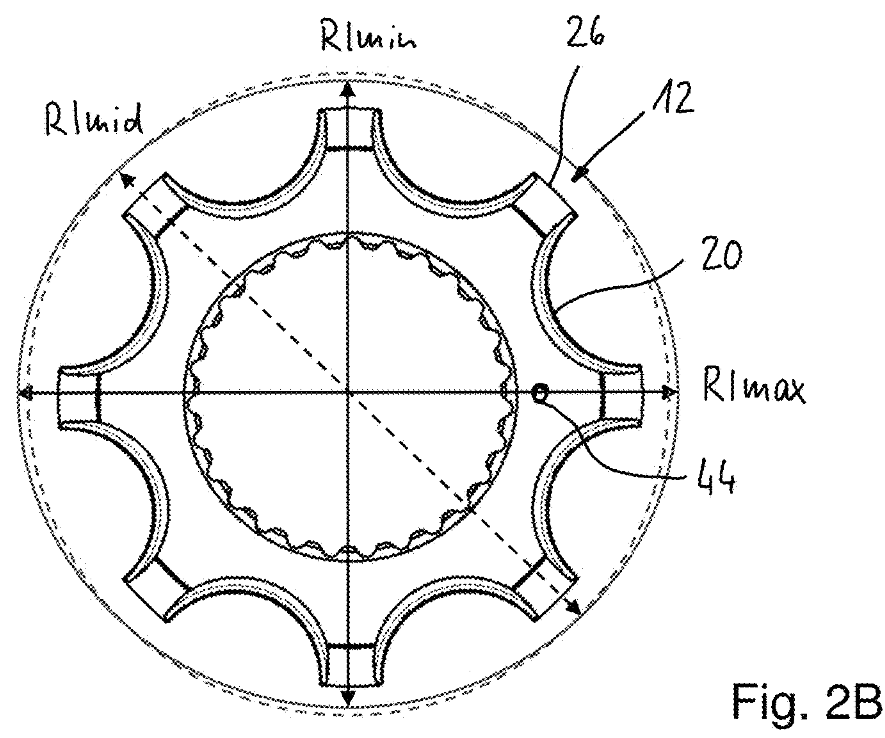
FIG. 2B shows the inner joint part shown in FIG. 1A with the specified dimensions shown in exaggerated form.

The subsequent hardening causes hardening distortions on the outer joint part 18. These hardening distortions lead to different radii of the outer joint part 11 over the circumference and/or to different radii of the ball centers of the balls 14 accommodated in the ball tracks 18 relative to the longitudinal axis A11. In the hardened state, the centers of all balls 14 in a cross-section through the aligned joint, as shown in FIG. 1A or FIG. 2A, when the balls 14 are in contact with the outer ball tracks 18, as shown in FIG. 1D, define an outer ring line RL11. As can be seen in FIG. 2A, this outer ring line RL11 through all ball centers has an irregular shape with a largest outer ring line diameter DOmax and a smallest outer ring line diameter DOmin. In the simplified example shown here, the outer ring line RL11 has an elliptical shape that is symmetrical to its axes. It is understood that an outer joint part 11 can in reality have a shape that deviates from this, in particular an asymmetrical shape. For example, the ball tracks 18 can describe any other irregular ring line shapes, such as polygonal or wavy ring lines RL11 with irregular maxima and minima around the circumference.

As can be seen from FIG. 1D, the outer ball tracks 18 in the present embodiment may be designed such that, viewed in cross-section, a two-point contact is formed in each case with the associated torque-transmitting ball 14. A two-point contact can be created, for example, by a gothic or elliptical track shape when viewed in cross-section. An angle γ22, γ22' is included between a radial plane ER through the center of the ball and a line through the contact points 22, 22', which can be between 30° and 50°, for example. A two-point contact respectively a two-point track makes it possible to carry out a self-centering measurement of the ball tracks 18. In principle, however, a circular track can also be used.

Regardless of the shape, the individual determined ball centers M14 of the balls 14 can be connected to form an outer ring line RL11 in such a way that the ring line may have a continuous or stepless course around the circumference. This also applies to the inner ring line RL12 of the inner joint part 12, which is described in more detail below. The cross-section through the aligned constant velocity plunging joint 10 used to define the outer and/or inner ring line can lie in a main working range of the joint, in particular within a range of plus minus 10 mm around an axial center M18 of the outer ball tracks 18.

Due to the contour-defining finish-machining before hardening and subsequent hardening, the outer joint part 11 has a non-circular shape, with the largest outer ring line diameter DOmax being at least 0.15% larger than the smallest outer ring line diameter DOmin, i.e. DOmax>=1.0015*DOmin. It is understood that larger differential ratios DOmax/DOmin of at least 1.025, at least 1.004 or at least 1.005, for example, are also possible. For a joint type with an ideal circular pitch circle diameter PCDsoll of the balls 14, the smallest outer ring line diameter DOmin can be between PCDsoll minus 0.5% to 1.0% of PCDsoll, for example, i.e: (PCDsoll−1.0%*PCDsoll)<DOmin<(PCDsoll−0.5%*PCDsoll).

Accordingly, the largest outer ring line diameter DOmax can, for example, be between PCDsoll plus 0.5% to 1.0% of PCD target, i.e. (PCDsoll+0.5%*PCDsoll)<DOmax<(PCDsoll+1.0%*PCDsoll).

A difference value DOdiff and a mean outer ring line diameter DOmid can be calculated from the values determined for DOmax and DOmin:

$$DOdiff = DO\max - DO\min$$

$$DOmid = (DO\max + DO\min)/2.$$

The mean outer ring line diameter DOmid is shown as a dashed line in FIG. 2A.

In order to compensate for the hardening distortions of the outer joint part 11, the inner joint part 12 is produced in particular in such a way that the circumferentially distributed inner ball tracks 20 are prefabricated with oversize, after which at least sections of the inner ball tracks 20 are hardened and then finish-machined to the desired geometry. However, it is also possible to finish-machine the inner joint part in a soft state, i.e. non-hardened state, and not to subject it to any further mechanical processing after hardening. The ball tracks 20 of the inner joint part 12 are machined in such a way that, in cross-section through the aligned joint with the balls in contact with the inner ball tracks, an inner ring line RL12 through all ball centers M14 of the balls 14 has a non-circular shape with a largest inner ring line diameter DImax and a smallest inner ring line diameter DImin. The ball tracks 20 can be produced with a high manufacturing accuracy of a few micrometers by the machining process.

The target geometry for manufacturing the ball tracks 20 of the inner joint part 12 can be derived from the above-mentioned values of the outer joint part 11. In other words, the inner joint part 12 is specifically produced in such a way that it deviates from a symmetrical, round shape. In doing so, with a view to the arrangement and geometry of the ball tracks and the ball centers defined thereby upon ball contact in the respective track, a non-circular, in particular elliptical shape with a largest and a smallest diameter is produced.

More specifically, the inner ball tracks 20 can be finish-machined so that the largest inner ring line diameter DImax is greater than the sum of the mean outer ring line diameter DOmid and 0.25 times the outer diameter difference DOdiff and/or is smaller than the largest outer ring line diameter DOmax, i.e:

$$DI\max > DOmid + 0.25 * DOdiff$$

and/or $$DI\max < DO\max.$$

The smallest inner ring line diameter DImin is at least one of smaller than the smallest outer ring line diameter DOmin, smaller than the difference between the mean outer ring line diameter DOmid and 0.25 times the outer diameter difference DOdiff, and/or larger than the difference between the mean outer ring line diameter DOmid and 0.75 times the outer diameter difference DOdiff, that is:

$$DI\min < DO\min,$$

$$DI\min < DOmid - 0.25 * DOdiff$$

and/or $$DI\min > DOmid - 0.75 * DOdiff.$$

For a joint type with an ideal-circular pitch circle diameter (PCD) of the balls 14 of 60.00 mm, the smallest outer ring diameter DOmin can be between 59.04 mm and 59.07 mm, for example, and the largest outer ring diameter DOmax can be between 60.03 mm and 60.06 mm, for example. Assuming exemplary values for DOmin of 59.04 mm and DOmax of 60.06 mm, this results in DOdiff=1.02 mm and DOmid=59.55 mm. From this, the ring line RL12 of the inner joint part 12 can be determined, respectively the corresponding contours of the inner ball tracks 20 for generating the ring line RL12. In particular, the largest inner ring line diameter DImax for the ring line RL12 of the inner joint part 12 is greater than 59.80 mm and smaller than the largest outer ring line diameter DOmax, i.e. 59.8 mm<DImax<60.06 mm. The smallest inner ring line diameter DImin for the ring line RL12 is in particular smaller than 59.29 mm and/or smaller than 59.04 and/or larger than 58.78 mm, i.e. 59.04 mm>DImin>58.78 mm. It should be understood that these specifications are merely exemplary possibilities.

In further detail, the inner joint part 12 can be produced such that the largest inner ring line diameter DImax is equal to the sum of the mean outer ring line diameter DOmid and 0.4 times to 0.6 times the outer diameter difference value DOdiff and/or that the smallest inner ring line diameter DImin is equal to the difference between the mean outer ring line diameter DOmid and 0.4 times to 0.6 times the outer diameter difference value DOdiff.

The inner joint part 12 produced in this way is then mounted relative to the outer joint part 11 in such a way that an angle formed between the largest inner ring line diameter DImax and the largest outer ring diameter DOmax is less than 30°. To facilitate assembly, the inner joint part 12 and/or the outer joint part 12 can be provided with a marking 44 that represents an associated largest or smallest ring line diameter. By aligning the assembly of the inner joint part 12 to the outer joint part 11 with respect to the angular position, a reduction in the maximum ball play of the balls 14 in the associated outer and inner ball tracks 18, 20 is achieved, which has a favorable effect on the vibration behavior and the service life of the joint.

In the present exemplary embodiment, the pairs of tracks formed from an outer ball track 18 and an inner ball track 20 each lie with their track center lines in radial planes through the joint. In the present case, the radial planes have the same angular distance from each other, wherein joints with unequal pitch angles are also possible, for example so-called "twin ball" joints. The number of torque-transmitting balls 14 and correspondingly the number of outer and inner ball tracks 18, 20 is eight in the present case, without being limited thereto. A pitch angle is formed between two balls 14 that are adjacent in the circumferential direction. According to a specific embodiment, the angle formed between the largest inner ring line diameter DImax and the largest outer ring diameter DOmax can be smaller than a smallest pitch angle.

The inner joint part 12 is shown as detail in FIGS. 3A to 3D, collectively also referred to as FIG. 3. The outer spherical guide face 26 of the inner joint part 12 is ideally round when viewed in cross-section through the inner joint part, i.e. it is produced with a manufacturing tolerance of in particular plus/minus 0.03 mm with respect to a nominal outer diameter. The outer spherical guide face 26 may be hardened at least in partial sections which come into contact with the inner guide face 16 of the outer joint part 11 during operation of the joint, and is machined after hardening, in particular by a cutting process, such as turning, milling or grinding.

In the present embodiment, the ball tracks 20 of the inner joint part 12 each have a first track section 28, in which the balls 14 are guided during operation, and a second track section 29, which does not perform a guiding function for the balls. The ball tracks 20 are machined after hardening in the first track sections 28, which can also be referred to as functional sections. The ball tracks may be produced here with a manufacturing tolerance of less than plus/minus 0.1 mm, in particular less than plus/minus 0.03 mm. The machining required to achieve the desired high manufacturing accuracy can be carried out by grinding, for example.

The second track section 29—viewed in longitudinal section through the track base, as shown in the lower half of FIG. 3C—is formed deeper than the first track section 28. The second track section 29 formed in this way thus forms a run-out for a tool for hard machining the first track section 28. A step 30 can be formed between the first and second track sections 28, 29. In the present case, the first track section 28 has a greater length than the second track section 29.

The inner joint part 12 can be produced, for example, by preforming and/or forging a blank to a preformed part with an outer face with ball tracks 20 distributed over the circumference, a central through opening 31, a first end face 32 and a second end face 33 directed in the opposite direction. The tracks of the preformed blank can each already have a first track section 28 with a smaller track cross-sectional geometry and a second track section 29 with a larger track cross-sectional geometry. The preformed blank is then hardened at least in the first track sections 28, while the second track sections 29 can remain unhardened. The first track sections 28 are then hard-machined to the desired geometry, while the second track sections 29 can remain unmachined.

As can be seen from FIG. 3D, in the present embodiment the inner ball tracks 20 may also be designed such that, when viewed in cross-section, a two-point contact is respectively formed with an associated ball 14. The contact points 36, 36' each form an angle γ36, γ36' with a radial plane ER. Alternatively, a circular track can also be used.

The balls 14 can be produced with a manufacturing tolerance of less than plus minus four micrometers with respect to a nominal ball diameter. This provides a high degree of accuracy, so that no classification of the balls 14 according to their dimensions to individual ball tracks 18, 20 is required.

Figures 4A, 4B:
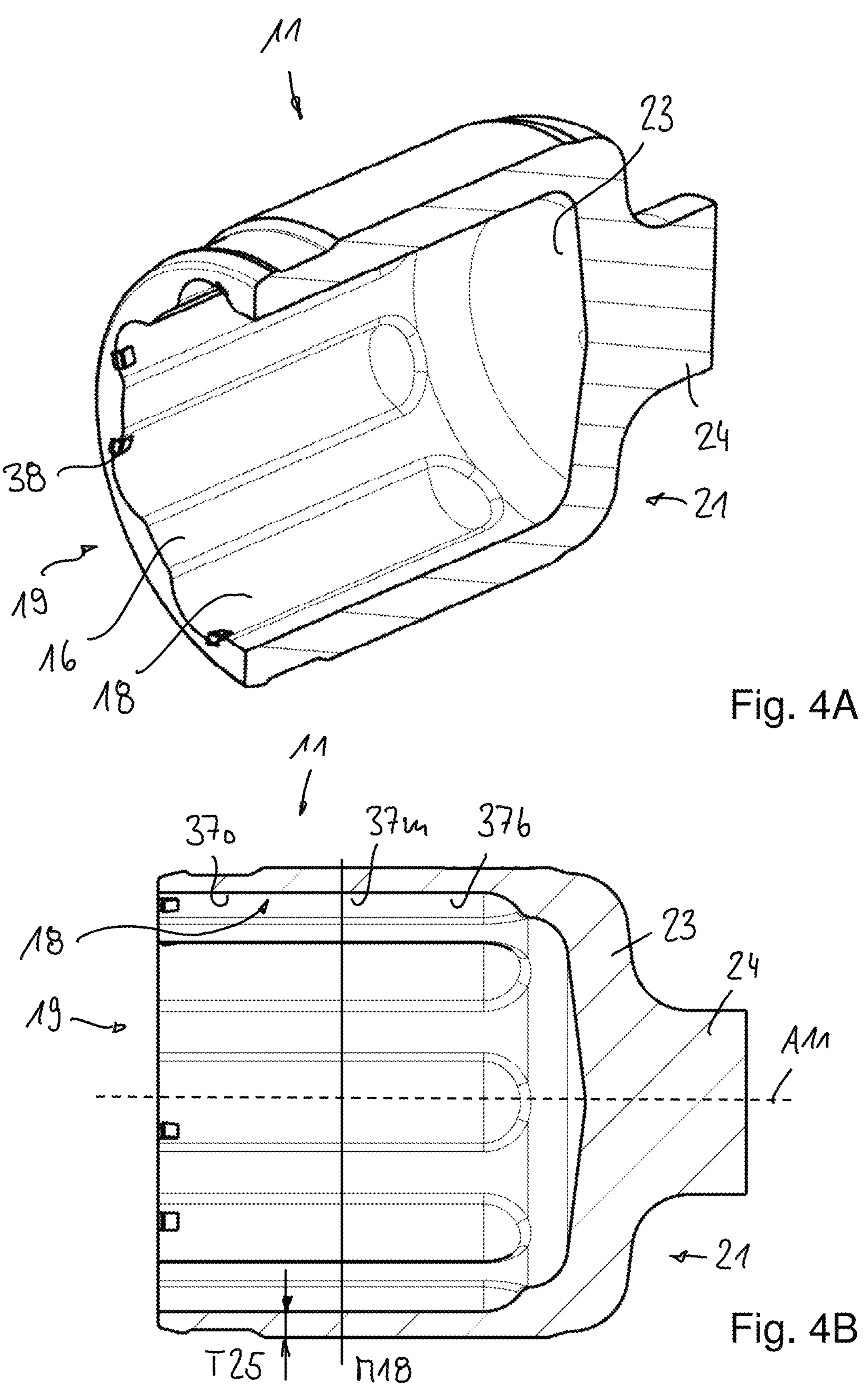
FIG. 4A shows the outer joint part of FIG. 1A in perspective sectional view.
FIG. 4B shows the outer joint part of FIG. 1A respectively 4A in half longitudinal section.

FIGS. 4A and 4B show the outer joint part 11 in detail. The outer joint part 11 has a sleeve respectively wall section 25 in which the ball tracks 18 are formed. In longitudinal section through the base of a ball track 18, the wall section 25 has a radial thickness T25. The ratio of the radial wall thickness T25 to the mean outer annular diameter DOmid can be less than or equal to 0.075, for example. Stop means 38 are provided at the opening-side ends of the ball tracks 18 in order to prevent the respective ball 14 from running out of the ball tracks unintentionally. The stop means 38 can be designed as forming regions or formed protrusions.

Figures 5A, 5B, 5C:
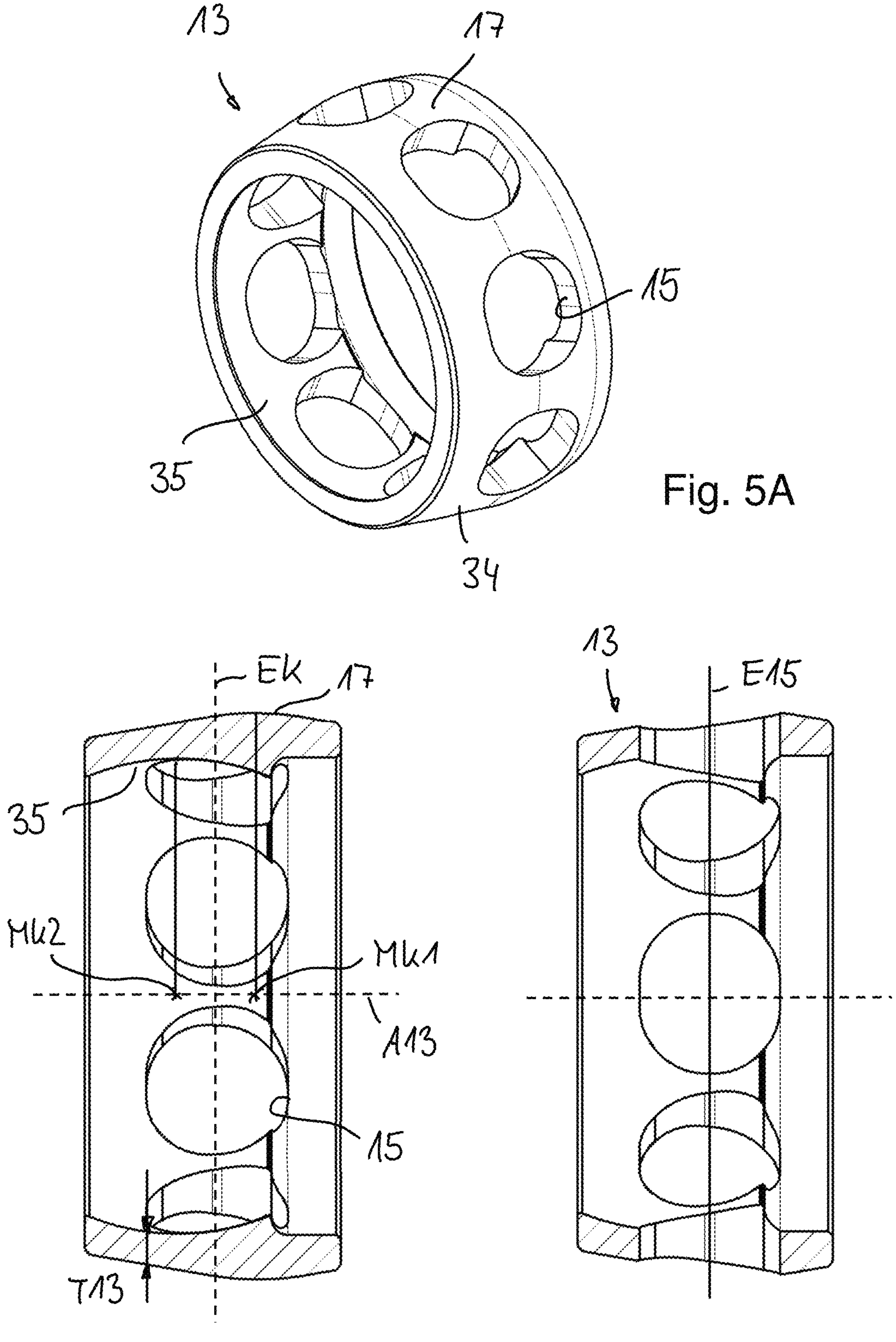
FIG. 5A shows the ball cage from FIG. 1A in a perspective view.
FIG. 5B shows the ball cage of FIG. 1A respectively 5A in longitudinal section through two opposite web regions.
FIG. 5C shows the ball cage of FIG. 1A respectively 5A in longitudinal section through two opposing window areas.

FIGS. 5A to 5C show the ball cage 15 as a detail. The ball cage 13 is annularly shaped around a cage axis A13 and comprises a conical free face 34 following the curved outer control face 17, with the conical free face 34 joining the control face 17 substantially tangentially. On its inner side, the ball cage 13 forms a concave inner control face 35 for guiding the ball cage 13 relative to the outer guide face 26 of the inner joint part 12. The outer control face 17 has a largest outer diameter around a first center point MK1, which lies at approximately the same axial distance from the window and/or ball plane EK in the opposite direction to a largest inner diameter of the inner control face 35 with center point MK2. This offset of the maximum diameters of the control faces gives the joint its name, namely double offset joint.

In the present embodiment, at least partial circumferential faces of the ball cage 13 may be ideally round, that is in particular produced with a manufacturing tolerance of plus/minus 0.03 mm in relation to a nominal circumferential diameter. The ball cage 13 has a minimum radial wall thickness between the inner control face 35 and the outer free face 34. The ratio of the smallest radial wall thickness to the pitch circle diameter (PCD) can be less than 0.08, for example.

In the present embodiment, the constant velocity plunging joint 10 is designed in such a way that the inner joint part 12 is angularly movable relative to the outer joint part 11 by a maximum articulation angle δ of 20°. In the installed state, a joint center plane EM is defined when the joint is aligned, as shown in FIG. 1B and FIG. 1C. The outer ball tracks 18 can each have a central working section 37*m* around the joint center plane EM respectively track senter M18 and, adjacent to the central working section 37*m* to the base 23 and to the opening 19, secondary track sections 37*b*, 370 on the base side and on the opening side. The outer ball tracks 18 can optionally be slightly widened in the base-side secondary track section 37*b* and/or in the opening-side secondary track section 370 with respect to the central working section 37*m*, for example by at least 0.1 mm. FIGS. 1B and IC also show a drive shaft 39, which is inserted into the splines of the inner joint part 12 in a rotationally fixed manner and is secured axially relative to the latter by a retaining ring 40. Furthermore, a boot 41 is provided, the large collar 42 of which is tightly connected to the outer joint part 11 and the small collar 43 of which is tightly connected to the drive shaft 39 by means of corresponding fastening rings.

As already mentioned above, the joint is designed as a double offset joint without being limited to this. Other joint types, such as VL or XL joints, can also be designed with the outer and inner joint parts being configured in a deliberately non-round and rotationally aligned manner.

A constant velocity plunging joint 10 has the advantage that it has a long service life and good properties with regard to noise, vibration and harshness behavior ("NVH") while being easy to manufacture.

The invention claimed is:

1. A constant velocity plunging joint, comprising:

an outer joint part with an outer part longitudinal axis and circumferentially distributed outer ball tracks, wherein at least portions of the outer ball tracks being hardened, wherein the outer ball tracks being mechanically finish-machined before hardening, i.e. being mechanically unmachined after hardening;

an inner joint part with an outer spherical guide face and a plurality of circumferentially distributed inner ball tracks, wherein at least portions of the inner ball tracks are hardened;

balls, which are arranged in pairs of tracks, each comprised of an outer ball track and an inner ball track;

a ball cage, which is arranged between the outer joint part and the inner joint part and which has a cage inner face, a cage outer face and circumferentially distributed cage windows, which each receive at least one of the balls, wherein, in a cross-section through the plunging joint in an aligned condition and with the balls in contact with the outer ball tracks, an outer ring line through all ball centers of the balls has an irregular shape with a largest outer ring line diameter and a smallest outer ring line diameter, wherein the largest outer ring line diameter is greater than the smallest outer ring line diameter by an outer diameter difference value of at least 0.15%, and wherein a mean outer ring line diameter is defined as half the sum of the largest outer ring line diameter and the smallest outer ring line diameter;

wherein the inner ball tracks of the inner joint part are produced in such a way that in cross-section through the plunging joint in an aligned condition, with the balls in contact with the inner ball tracks, an inner ring line through all ball centers of the balls has a non-circular shape with a largest inner ring line diameter and a smallest inner ring line diameter, wherein the largest inner ring line diameter is greater than the sum of the mean outer ring line diameter and 0.25 times the outer diameter difference value, and wherein the smallest inner ring line diameter is smaller than the difference between the mean outer ring line diameter and 0.25 times the outer diameter difference value, and wherein the inner joint part is mounted relative to the outer joint part such that an angle formed between the largest inner ring line diameter and the largest outer ring line diameter is smaller than 30°.

2. The constant velocity plunging joint according to claim 1, wherein the outer ring line (RL11) and/or inner ring line (RL12) is continuous.

3. The constant velocity plunging joint according to claim 1, wherein the cross-section through the plunging joint in the aligned condition lies in a main working area of the joint, that is within a range of plus minus 10 mm around an axial middle of the outer ball tracks.

4. The constant velocity plunging joint according to claim 1, wherein the largest inner ring line diameter is equal to the sum of the mean outer ring line diameter and 0.4 to 0.6 times the outer diameter difference, and wherein the smallest inner ring line diameter is equal to the difference between the mean outer ring line diameter and 0.4 to 0.6 times the outer diameter difference.

5. The constant velocity plunging joint according to claim 1, wherein a pitch angle is formed between two balls which are adjacent in the circumferential direction, with the angle formed between the largest inner ring line diameter and the largest outer ring line diameter being smaller than the pitch angle.

6. The constant velocity plunging joint according to claim 1, wherein the inner joint part is provided with a marking which represents an associated largest ring line diameter or smallest ring line diameter.

7. The constant velocity plunging joint according to claim 1, wherein the inner ball tracks are produced by hard-machining with a manufacturing tolerance of less than 1/10 mm.

8. The constant velocity plunging joint according to claim 1, wherein the outer joint part has a radial wall thickness in a longitudinal section through a ball groove base, where a ratio of the radial wall thickness to the mean outer ring line diameter is less than or equal to 0.075.

9. The constant velocity plunging joint according to claim 1, wherein the outer joint part comprises an inner face in which the outer ball tracks are formed in a radially outward direction, with the inner face being machined.

10. The constant velocity plunging joint according to claim 1, wherein the outer spherical guide face of the inner joint part is ideally round when viewed in cross-section through the inner joint part, i.e. is produced with a manufacturing tolerance of plus/minus 0.03 mm with respect to a nominal outer diameter.

11. The constant velocity plunging joint according to claim 1, wherein the outer spherical guide face is hardened and machined at least in portions.

12. The constant velocity plunging joint according to claim 1, wherein at least partial peripheral faces of the ball cage are ideally round, i.e. are produced with a manufacturing tolerance of plus/minus 0.03 mm in relation to a nominal peripheral diameter.

13. The constant velocity plunging joint according to claim 1, wherein the ball cage has a curved outer control face around a first center point and an outer free face and an inner spherical control face around a second center point, the first center point and the second center point each lying at an axial distance from a central plane of the ball cage, wherein the ball cage has a smallest radial wall thickness between the inner spherical control face and the outer free face, wherein a ratio of the smallest radial wall thickness to the pitch circle diameter is less than 0.08.

14. The constant velocity plunging joint according to claim 1, wherein the balls are produced with a manufacturing tolerance of less than plus minus four micrometers with respect to a nominal ball diameter.

15. The constant velocity plunging joint according to claim 1, wherein the inner joint part is angularly movable relative to the outer joint part by a maximum articulation angle of 20°.

16. The constant velocity plunging joint according to claim 1, wherein, in an installed state with the joint aligned, a joint center plane is defined, with the outer ball tracks each having a central working section around the joint center plane and, adjoining the central working section towards a base, a base-side secondary section, and adjoining the central working section towards a joint opening, an opening-side secondary section, wherein the outer ball tracks in at least one of the base-side secondary section or in the opening-side secondary track section are widened by at least 0.1 mm relative to the central working section.

17. The constant velocity plunging joint according to claim 1, wherein the outer ball tracks are finish worked in a non-cutting manner by forging, or in a cutting manner by milling, before hardening.

18. The constant velocity plunging joint according to claim 1, wherein the at least portions of the inner ball tracks are machined after hardening.

19. The constant velocity plunging joint according to claim 1, wherein the constant velocity plunging joint is designed as a double offset joint.

20. A method of producing a constant velocity plunging joint, the method comprising:

producing an outer joint part having a longitudinal axis, a connection side and an opening side, an inner face and outer ball tracks, the outer ball tracks being soft-finished and then hardened, that is, remaining mechanically unprocessed after hardening, wherein, viewed in a cross-section through the outer joint part, an outer ring line with an irregular shape with a largest outer ring line diameter and a smallest outer ring line diameter is defined by ball contact points of the outer ball tracks, wherein the largest outer ring line diameter is larger than the smallest outer ring line diameter by an outer diameter difference value of at least 0.15%, and wherein a mean outer ring line diameter is defined as half the sum of the largest outer ring line diameter and the smallest outer ring line diameter, producing an inner joint part with a longitudinal axis, an outer face and with inner ball tracks, the inner ball tracks being produced in such a way that, viewed in a cross-section through the inner joint part, ball contact points of the inner ball tracks define an inner ring line with a non-circular shape with a largest inner ring line diameter and a smallest inner ring line diameter, such that the largest inner ring line diameter is greater than the sum of the mean outer ring line diameter and 0.25 times the outer diameter difference value, and the smallest inner ring line diameter is smaller than the difference between the mean outer ring line diameter and 0.25 times the outer diameter difference value, producing a ball cage with a cage axis, an inner cage face, an outer cage face and cage windows distributed circumferentially around the cage axis;

inserting the inner joint part into the ball cage;

inserting of the inner joint part with ball cage into the outer joint part such that an angle formed between the largest inner ring line diameter and the largest outer ring line diameter is less than 30°; and inserting balls into the cage windows, wherein pairs of tracks each comprised of an outer ball track and an inner ball track each accommodate one of the balls.

* * * * *